United States Patent
Blessent

(10) Patent No.: US 7,072,306 B2
(45) Date of Patent: Jul. 4, 2006

(54) REVERSE OUTER LOOP OPTIMIZATION FOR COMMUNICATION CHANNELS WITH DISCONTINUOUS TRANSMISSION (DTX)

(75) Inventor: Luca Blessent, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 976 days.

(21) Appl. No.: 10/042,071

(22) Filed: Oct. 18, 2001

(65) Prior Publication Data

US 2003/0092459 A1    May 15, 2003

Related U.S. Application Data

(60) Provisional application No. 60/327,697, filed on Oct. 5, 2001.

(51) Int. Cl.
*G01R 31/08* (2006.01)
*H04B 7/216* (2006.01)
*H04J 4/16* (2006.01)

(52) U.S. Cl. .................. 370/252; 455/69; 455/522; 370/335; 370/465

(58) Field of Classification Search ............ None
See application file for complete search history.

(56) References Cited

U.S. PATENT DOCUMENTS

| | | | | |
|---|---|---|---|---|
| 6,058,107 A | * | 5/2000 | Love et al. | 370/332 |
| 6,144,841 A | * | 11/2000 | Feeney | 455/69 |
| 6,400,960 B1 | * | 6/2002 | Dominique et al. | 455/522 |
| 6,490,262 B1 | * | 12/2002 | Hogger | 370/337 |
| 6,597,923 B1 | * | 7/2003 | Vanghi et al. | 455/522 |
| 6,804,530 B1 | * | 10/2004 | Chheda et al. | 455/522 |
| 6,862,275 B1 | * | 3/2005 | Dabak | 370/342 |
| 2004/0081097 A1 | * | 4/2004 | Dominique et al. | 370/232 |

FOREIGN PATENT DOCUMENTS

| | | |
|---|---|---|
| EP | 1089456 | 4/2001 |
| WO | 0048336 | 8/2000 |
| WO | 0074289 | 12/2000 |

* cited by examiner

*Primary Examiner*—Chau Nguyen
*Assistant Examiner*—Cynthia L. Davis
(74) *Attorney, Agent, or Firm*—Philip R Wadsworth; Charles D Brown; George C. Pappas

(57) ABSTRACT

A method and device is disclosed for outer loop power control for communication over a channel employing DTX. A device having DTX detection compensates for a known non-zero probability of DTX detection given an Erasure frame, $P(D|E)$, by determining a compensation factor and adjusting a desired or expected target FER with the compensation factor to achieve a compensated target FER. The $P(D|E)$ may be known or estimated to be a constant value, the value of $P(D|E)$ may also be dynamically determined based on channel conditions. The method and device may also compensate for a non-zero $P(E|D)$, i.e. a probability of an Erasure detection given a DTX. A number of consecutive DTX indications triggers the outer loop to reduce the power control setpoint by a predetermined value or by a dynamically determined value. A dynamic value may be determined from an identified number of Erasure frame detections.

29 Claims, 8 Drawing Sheets

STATE 0

STATE 1

STATE 2

S3_COUNT COMPENSATION

REVERSE OUTER LOOP OPTIMIZATION FOR COMMUNICATION CHANNELS WITH DISCONTINUOUS TRANSMISSION (DTX)

RELATED APPLICATIONS

This application claims the benefit of provisional U.S. Application Ser. No. 60/327,697, entitled "REVERSE OUTER LOOP ALGORITHM FOR CHANNELS WITH DISCONTINUOUS TRANSMISSION (DTX) WITH NON-IDEAL DTX DETECTION," filed Oct. 5, 2001, which is incorporated herein by reference in its entirety for all purposes.

BACKGROUND OF THE INVENTION

1. Field of the Invention

The present invention relates to capacity optimization in communication channels. More particularly, the present invention relates to optimization of Reverse Outer Loop Power Control (ROLPC) when the channel is capable of discontinuous transmission (DTX).

2. Description of the Related Technology

Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (4) some other standards.

Resource limitations drive a constant demand for increased channel capacity in communication links. The resource limitations may include space limitations, such as the internal dimensions of a conduit for wire-line communication channels, temporal limitations, such as allowable delay in real time data analysis, or bandwidth limitations, such as frequency spectra in wireless transmission channels where the spectral bandwidth of a channel is regulated.

Various techniques have been developed and implemented in order to increase channel capacity. Communication channel capacity may be increased by implementing multiplexing techniques, examples of which include, but are not limited to, time multiplexing, frequency multiplexing, code multiplexing, or a combination of multiplexing techniques.

Many users share a single communication channel when the channel is multiplexed. A user allocated a portion of the multiplexed channel may engage in active, continuous transmission over the allocated channel or may engage in discontinuous transmission (DTX) where transmission on the allocated portion of the channel is not continuous but may be burst transmissions.

Closed loop power control is used in the reverse link of a CDMA wireless communication system to ensure the reverse link transmit power is accurately controlled. In reverse closed loop power control, a base station (BS) (or base station controller (BSC)) measures the signal level received from each mobile station (MS) and provides feedback to each MS with instructions to adjust the MS transmit power. The closed loop power control loop attempts to adjust each MS transmit power to cause the reverse link transmit signals from all of the MS in the cell to arrive at the minimum level of power required for each MS to achieve a desired Quality of Service (QoS).

The base station measures the received signal-to-interference ($E_b/I_0$) and compares the measured value to an adjustable threshold known as the power control setpoint. When the measured $E_b/I_0$ is above the setpoint, the base station instructs the MS to reduce the reverse link transmit power by a predetermined amount, e.g., 1 dB. When the measured $E_b/I_0$ is below the threshold, the BS sends the MS a command to increase the reverse link transmit power by a fixed amount.

The value of the power control setpoint largely determines the QoS maintained by the MS. The QoS is measured as a Frame Erasure Rate (FER), alternatively known as the Frame Error Rate. As expected, increasing the value of the power control setpoint reduces the FER, thereby providing a higher QoS. Reducing the power control setpoint increases the FER. Adjusting the threshold of the power control setpoint occurs in a process known as Reverse Outer Loop Power Control (ROLPC).

The implementation of ROLPC for just one active channel (e.g., in a CDMA 2000 system operating in P1 mode) is relatively straightforward because frames are continuously transmitted on the active channel by the MS and the $E_b/I_0$ and FER may be updated based on the active channel. However, when multiple channels are active and discontinuous transmission (DTX) is allowed for one or more channels, the implementation is substantially more complex. One difficulty is accurately distinguishing between frames that are DTX and frames that are not DTX but contain one or more bit errors after decoding.

Imperfect determinations of DTX and non-DTX frames result in a power control setpoint threshold that is imperfect. A setpoint that is too high results in reduced channel capacity.

It is desirable, during ROLPC adjustment of the power control setpoint to compensate for inaccurate DTX and non-DTX indications to optimize the power control setpoint and thus the reverse channel capacity.

SUMMARY OF THE INVENTION

A method and device is disclosed for outer loop power control for communication over a channel employing DTX. A device having DTX detection compensates for a known non-zero probability of DTX detection given an Erasure frame, P(D|E), by determining a compensation factor and adjusting a desired or expected target FER with the compensation factor to achieve a compensated target FER. The P(D|E) may be known or estimated to be a constant value, the value of P(D|E) may also be dynamically determined based on channel conditions.

The method and device may also compensate for a non-zero P(E|D), i.e. a probability of an Erasure detection given a DTX. A number of consecutive DTX indications triggers the outer loop to reduce the power control setpoint by a predetermined value or by a dynamically determined value. A dynamic value may be determined from an identified number of Erasure frame detections.

BRIEF DESCRIPTION OF THE DRAWINGS

The features, objects, and advantages of the invention will become more apparent from the detailed description set forth below when taken in conjunction with the drawings in which like reference characters identify correspondingly throughout and wherein.

DETAILED DESCRIPTION OF THE INVENTION

Figure 1:
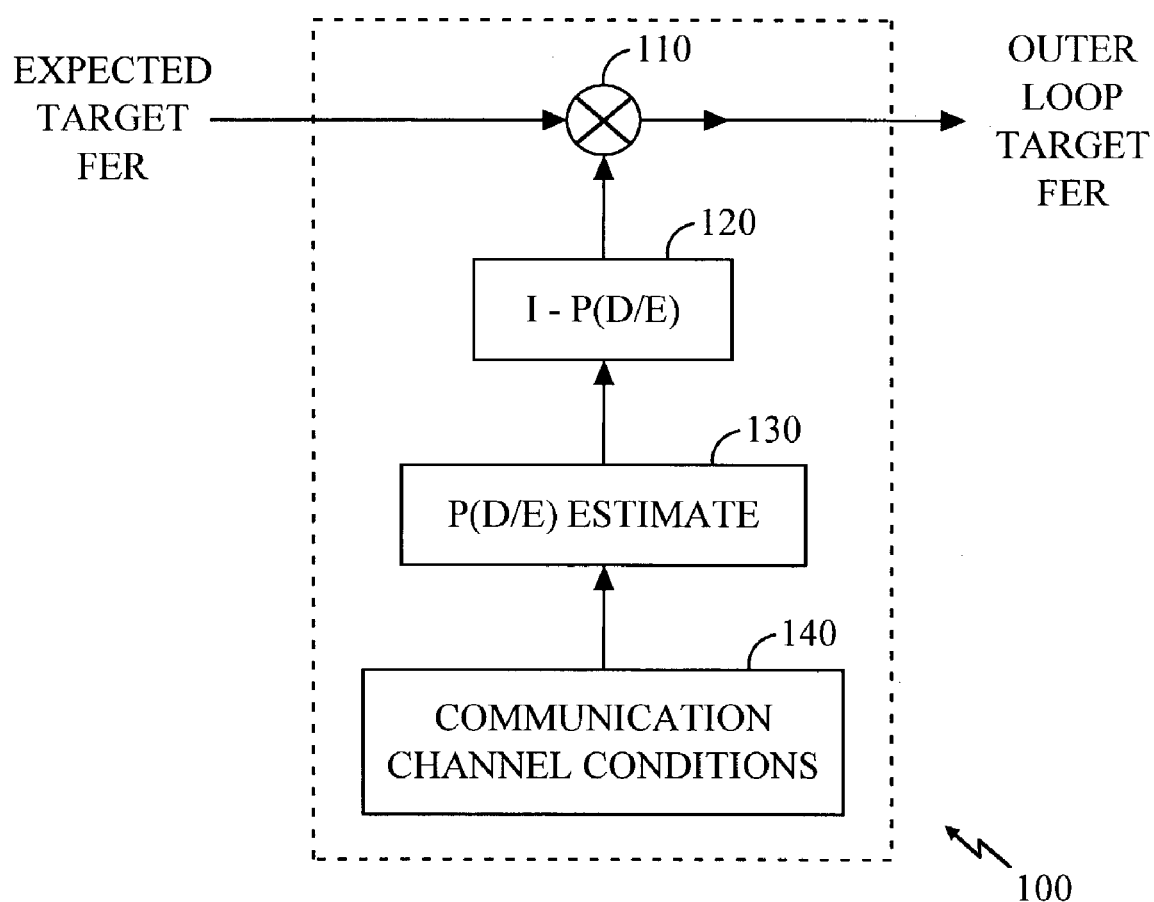
FIG. 1 is a functional block diagram of Outer Loop Target FER compensation for false DTX detection.

Wireless telephone systems are capable of carrying both voice and data over the allocated communication channels. Digital wireless telephone systems are particularly suited to carrying data over the allocated communication channels. It is possible for the system to dedicate a channel to a user, via the user's Mobile Station (MS), in order to accomplish data transmission. A continuously active channel is preferable when the anticipated data transmission is continuous. With a continuously active channel, the user is able to efficiently transmit a continuous data stream over the allocated active channel of the communication system. However, the explosion of packet data applications, such as those used when communicating over the Internet, make allocating a continuously active channel to a single user an over allocation of resources. Additionally, because wireless telephone rates are often tied to connection times, a user may not be willing to use a MS to connect to a remote network if a continuous active channel must be dedicated to the connection.

The designers of wireless telephone systems have recognized the desire for packet data applications over wireless channels. The designers have also recognized that packet data and the associated bursty transmissions may be transmitted over channels that are not continuously active, but rather, allow for discontinuous transmission (DTX).

CDMA 2000, for example, provides for six different radio configurations for the Reverse Traffic Channel. The signals that may be transmitted on the Reverse Traffic Channel are defined to include a Reverse Dedicated Control Channel, a Reverse Fundamental Channel, A Reverse Supplemental Channel, and a Reverse Supplemental Code Channel. Only some of the channels will be present in any particular radio configuration. The CDMA 2000 standard allows an operating mode (referred to as P2 mode) in which the Reverse Dedicated Control Channel (R-DCCH) is used together with the Reverse Supplemental Channel (R-SCH) without the transmission of a Reverse Fundamental Channel (R-FCH).

The CDMA 2000 standard allows both R-DCCH and R-SCH to support DTX. Both channels independently have the possibility of a DTX occurrence due to a frame not having been transmitted by a Mobile Station (MS). This occurs when the MS has no data to be transmitted or, in case of the R-SCH, when the MS does not have enough available power to transmit the R-SCH.

Because DTX is controlled by the MS, the Base Station (BS) has no a priori knowledge of when DTX will occur. Some type of DTX detection must occur at the receive end of the reverse link in order to determine the presence of DTX. DTX detection may be implemented in the Base Station, Base Station Controller, or in any signal processing stage following receipt of the reverse link transmission. One option is to implement DTX detection in Reverse Outer Loop Power Control (ROLPC).

The DTX detection algorithm runs independently on R-DCCH and R-SCH and may also be referred to as an R-DCCH (or R-SCH) Rate Determination Algorithm (RDA). The DTX detection algorithm provides one of the following possible outcomes for every received frame:

GOOD FRAME—the algorithm indicates a frame was transmitted by the MS and the decoded frame does not contain bit errors.

ERASURE—the algorithm indicates a frame was transmitted by the MS but the decoded frame contains bit errors.

DTX—the algorithm indicates no frame was transmitted by the MS.

Performance of the DTX detection algorithm is typically measured in terms of the following conditional probabilities:

$P(D|E)$=probability of declaring DTX when the event was ERASURE, i.e., the MS actually sent a frame but it was decoded with bit errors such that the DTX detection algorithm erroneously indicated DTX.

$P(E|D)$=probability of declaring ERASURE when the event was DTX, i.e., the MS did not send the frame but the DTX detection algorithm erroneously indicated ERASURE.

A perfect DTX detection algorithm is characterized by $P(D|E)=0$ and $P(E|D)=0$. As a practical matter, $P(D|E)$ and $P(E|D)$ are typically non-zero probability values. The larger the value of these probabilities, the larger the effect on Reverse Outer Loop Power Control (ROLPC).

In a typical ROLPC the power control setpoint is increased by a predetermined UP step size upon receipt of an ERASURE indication from the DTX detection algorithm. The power control setpoint is decreased by a predetermined DOWN step size upon receipt of a GOOD FRAME indication from the DTX detection algorithm and the power control setpoint is left unchanged upon receipt of a DTX indication from the DTX detection algorithm.

The UP and DOWN step sizes are chosen such as to guarantee the convergence of the power control loop to a desired or specified target Frame Erasure Rate (FER). A typical desired FER may be in the range of 1–5%. An example of an implementation to target an average FER of 1% has an UP step size of 0.3314 dB and a DOWN step size of 0.003348 dB. One will recognize that the UP and DOWN step sizes need not be equal in size and that a larger step size will allow for faster loop convergence but at the cost of a higher average FER upon loop convergence. However, the following problems may occur for channels having DTX. First, a non-zero $P(D|E)$ may cause the outer loop to converge to a higher FER when the MS is transmitting in discontinuous mode on the R-DCCH (or R-SCH). The higher FER convergence occurs because not all the ERASURE events are reported by the DTX detection algorithm. Because some ERASURE events are reported as DTX, the setpoint is lower than necessary to achieve the desired Quality of Service for that MS and the result is a negative effect on data throughput. Second, a non-zero $P(E|D)$ causes the setpoint to be higher than it should be when the MS is not transmitting the R-DCCH (or R-SCH). This is because some DTX events are misclassified as ERASURE, with a negative effect on the Reverse Link capacity (since the Reverse Pilot Channel (R-PICH) is always transmitted). A setpoint higher than the minimum reduces channel capacity because the MS transmits at a higher power than is required to achieve the desired FER and the MS reverse link signal contributes to the interference power of all other reverse link communications operating within that cell.

A technique described below for ROLPC employing DTX detection significantly mitigates the effects of false DTX indications, resulting in an outer loop converging at too high of a FER, and the effects of false ERASURE indications, resulting in too high a setpoint.

The initial hypotheses that need to be satisfied for the optimum functionality of the proposed solution are the following:

a—$P(E|D)$ is relatively small, less than or equal to 10% b—$P(D|E)$ is less than or equal to 60% c—$P(D|E)$ is fairly constant when the communication channel conditions vary (i.e., different MS velocities and different multi-path profiles)

Where hypothesis c is not satisfied, an additional enhancement may be included to compensate for this. Such enhancement might include an estimation of the channel conditions.

Most CDMA wireless communication systems utilizing DTX satisfy the above hypothesis. Simulations of CDMA 2000 reverse links show for the R-DCCH, $P(E|D)$=approximately 0.1%, $P(D|E)$<=55% and hypothesis c is satisfied in most cases. The technique for improved ROLPC to compensate for false DTX indications contemplates that, assuming hypothesis b and c are satisfied, a compensation term be included in outer loop target FER such that the actual achieved FER is equal to the expected FER. This compensation factor is a function of $P(D|E)$. Specifically, the outer loop target FER should be computed as follows:

Outer Loop Target $FER$=Expected Target $FER*(1-P(D|E))$

In a simplified version of the proposed ROLPC algorithm, a constant value for $P(D|E)$ is selected and used to compute the Outer Loop Target FER. A more complex implementation, might dynamically select a $P(D|E)$ value based on an estimation of the communication channel conditions. This latter approach may be used to improve performance, particularly if hypothesis c is not satisfied. By utilizing a compensation factor, the possibility of convergence of the power control loop to a higher FER is greatly reduced.

FIG. 1 shows a functional block diagram of an FER compensation block 100 used to compensate for imperfect DTX detections, where the DTX detection algorithm indicates DTX when the frame was actually an ERASURE. An Expected Target FER is input to the FER compensation block 100. The Expected Target FER may be a value specified in a standard or operating guide or may be determined by calculating an FER required to achieve a desired level of Quality of Service. The Expected Target FER is coupled to the first input of a multiplier 110. The multiplier 110 has a second input that is provided the scaling factor. If the channel does not have DTX capability or the conditional probability of false DTX, $P(D|E)$, is zero the scaling factor will be equal to unity.

However, in a DTX enabled channel, the non-ideal performance of DTX detection results in a non-zero probability of false DTX detection. Thus, the scaling factor provided to the multiplier 110 will not be unity. The actual scaling factor is calculated by estimating the conditional probability of a false DTX detection. As stated above, the estimate of the $P(D|E)$ may be based on the hypothesis of fairly constant communication channels or may be based on an estimate of the communication channels. When the value of $P(D|E)$ is to be determined dynamically, the communication channel conditions are collected in a functional block 140 and provided to a $P(D|E)$ estimator 130. The communication channel condition collection block 140 and the $P(D|E)$ estimator 130 are optional when channel conditions are assumed to be fairly constant. The communication channel conditions may be collected or estimated from a variety of sources including, but not limited to, an average of the closed loop power control commands, initial open loop power control estimates, forward link received signal strength, running logs of slow or fast fades, or an actual estimate of channel conditions, if available. The $P(D|E)$ estimator 130 receives the communication channel conditions and makes an estimate of the value of $P(D|E)$. The output of the $P(D|E)$ estimator 130 is coupled to a scale factor block 120 where the actual scale factor is determined as $(1-P(D|E))$. When channel conditions are assumed to be fairly constant, the scale factor block 120 may output a constant. The value of $P(D|E)$ has been shown in simulations to be less than 55% for typical channel conditions and DTX detection algorithms. If $P(D|E)$ is estimated to be 0.55 to correspond to 55% then the scale factor is equal to 0.45. The output of the scale factor block 130, whether dynamic or constant, is provided as a second input to the multiplier 110. The resultant output of the multiplier 110 is the output of the FER compensation block 100, and represents the Outer Loop Target FER.

In a further aspect, the technique for improved ROLPC operates to lower the power control setpoint when it is determined that the setpoint was previously increased due to a false ERASURE (the event was a DTX but the DTX detection algorithm declared it as an ERASURE). The computation of the setpoint is described by a finite state machine.

First, the following quantities are defined.

SETP_UP_STEP_SIZE=step size for setpoint increase given target FER

SETP_DOWN_STEP_SIZE=step size for setpoint decrease given target FER

N_DTX_S0_TO_S1=number of consecutive DTX events to trigger transition from State 0 to State 1

N_DTX_LOWER_SETPOINT=number of consecutive DTX events to trigger a decrease of the setpoint S2_COUNT=number of frames the state machine remains in State 2 before going back to State 0

S3_COUNT=number of frames the state machine remains in State 3 before going to any other state K=arbitrary coefficient used to control the setpoint decrease in State 3. Default value is 1.

The state description and the corresponding transitions are as follows:

State 0:

The outer loop performs as a typical, uncompensated, outer loop, i.e., the setpoint is increased by SETP_UP_STEP_SIZE upon receipt of an ERASURE and the setpoint is decreased by SETP_DOWN_STEP_SIZE upon receipt of a GOOD FRAME. The setpoint is unchanged upon receipt of a DTX indication.

If N_DTX_S0_TO_S1 consecutive DTX indications are received, transition to State 1. Otherwise, remain in State 0.

State 1:

If GOOD FRAME is received, decrease the setpoint by SETP_DOWN_STEP_SIZE and transition to State 0.

If ERASURE is received, increase the setpoint by SETP_UP_STEP_SIZE, set S2_COUNT=1 and transition to State 2.

If DTX is received, do not change the setpoint and remain in State 1.

State 2:

If GOOD FRAME is received, decrease the setpoint by SETP_DOWN_STEP_SIZE, set S2_COUNT=0 and transition to State 0.

If ERASURE is received, increase the setpoint by SETP_UP_STEP_SIZE, increment S2_COUNT and remain in State 2.

If DTX is received, do not change the setpoint, set S3_COUNT=1 and transition to State 3.

State 3:

If GOOD FRAME is received, decrease the setpoint by SETP_DOWN_STEP_SIZE, set S2_COUNT=0, set S3_COUNT=0 and transition to State 0.

If ERASURE is received, increase the setpoint by SETP_UP_STEP_SIZE, increment S2_COUNT, set S3_COUNT=0 and transition to State 2.

If DTX is received, do not change the setpoint and increment S3_COUNT.

The state machine is updated after every frame. Following each update of the state machine an additional comparison may be made to determine whether or not a predetermined number (N_DTX_LOWER_SETPOINT) of consecutive DTX indications occurred. The comparison following each state machine update is performed in accordance with the following pseudo-code.

```
if ( S3_COUNT >= N_DTX_LOWER_SETPOINT )
{
  if ( S2_COUNT > 0 )
  {
    decrease setpoint by S2_COUNT * SETP_UP_STEP_SIZE * K
    set S2_COUNT = 0;
    set S3_COUNT = 0;
  }
}
```

The ROLPC setpoint computation may be described in terms of a flow chart as shown in FIGS. 2A–2D. The computation begins at point A 2100. Point A 2100 is not a functional block but rather indicates entry into State 0. The algorithm, in block 2102 waits for the next frame to be determined. The algorithm shown in FIGS. 2A–2D is run following receipt of each frame. After a frame is received and determined to be one of GOOD FRAME, ERASURE, or DTX, the routine next determines what effect the frame has on the setpoint. The algorithm checks to see if the frame was determined to be a GOOD FRAME 2110. If the frame is determined to be a GOOD FRAME then the routine proceeds to block 2114 where the setpoint is decreased by a predetermined amount, represented by the constant SETP_DOWN_STEP_SIZE. The ROLPC routine constantly seeks to maintain the minimum power required satisfying a desired Quality of Service. Following the decrease of the setpoint, the routine clears the DTX counter in block 2116 and returns to block 2102 to wait for the next frame. If the detected frame is determined in block 2110 to be not a GOOD FRAME, the routine proceeds to block 2120.

In block 2120, the routine checks to see if an ERASURE was detected. As noted before, an ERASURE indicates the MS sent a frame but the received frame contained bit errors. If an ERASURE was detected in block 2120, the routine proceeds to block 2124 where the setpoint is increased by a predetermined amount. The predetermined upward step size is represented by the constant SETP_UP_STEP_SIZE, which may or may not be equal to the predetermined downward step size. The setpoint increase causes the power control loop to signal the MS to slightly increase its transmitted power, thereby ensuring a higher quality signal received at the base station. After the setpoint is increased, the routine clears the DTX counter 2126 and returns to block 2102 to await the next frame.

If an ERASURE was not detected in block 2120 the frame must have been a DTX because this is the only remaining frame type that has not yet been checked. Thus, block 2130 determines that a DTX was detected and increments a consecutive DTX counter. The routine then proceeds to block 2140 to determine if a predetermined number, represented by the constant N_DTX_S0_TO_S1, consecutive DTX frames were detected. If the predetermined number of consecutive DTX indications have not been reached, the routine returns to block 2103 to await the next frame. If the predetermined number of consecutive DTX indications have been reached, the routine proceeds to the beginning of State 1, represented by point B 2200.

Figure 2A:
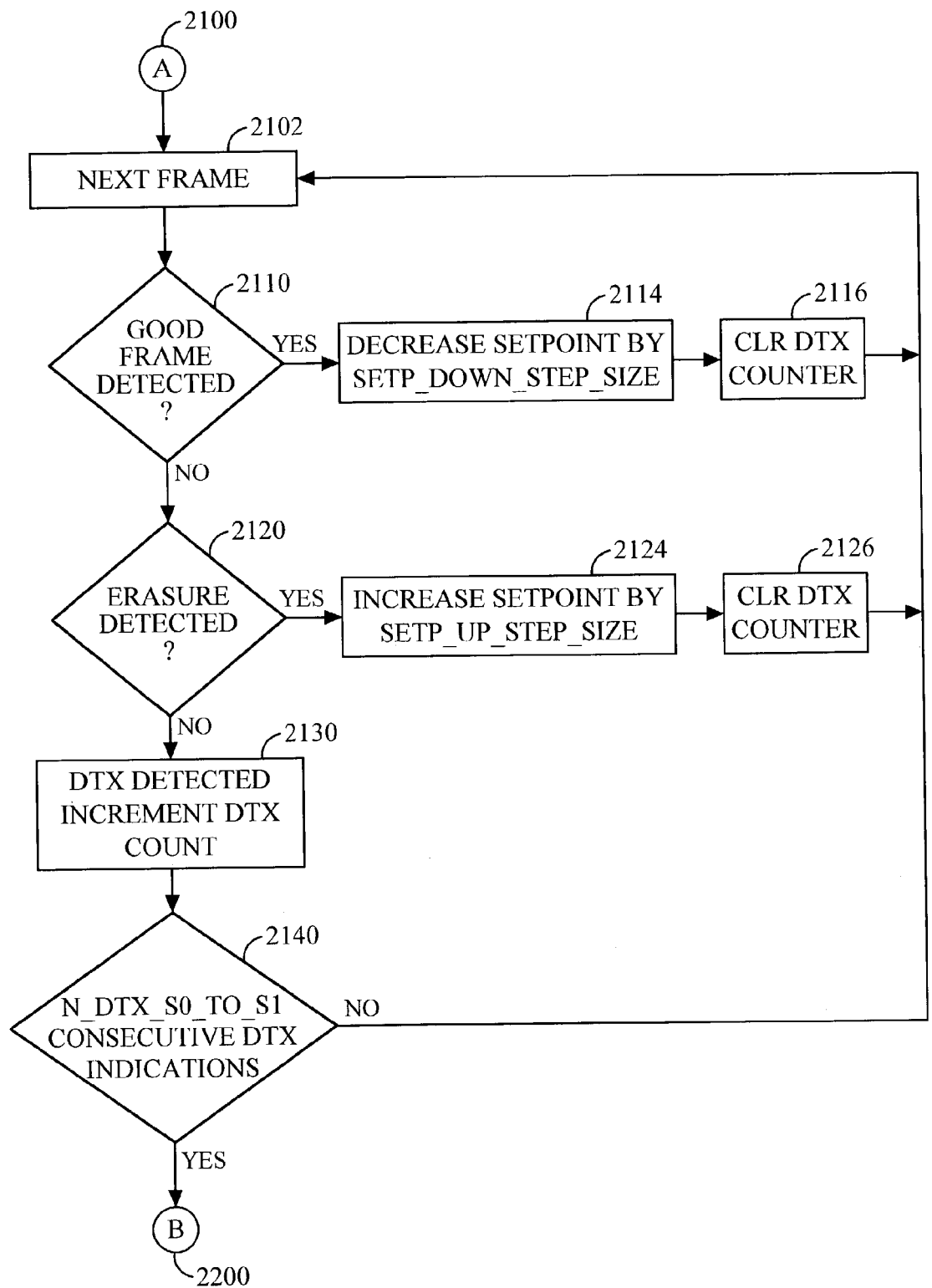
FIGS. 2A–2D illustrate a flow chart of power control setpoint optimization for imperfect DTX detection.
Figure 2B:
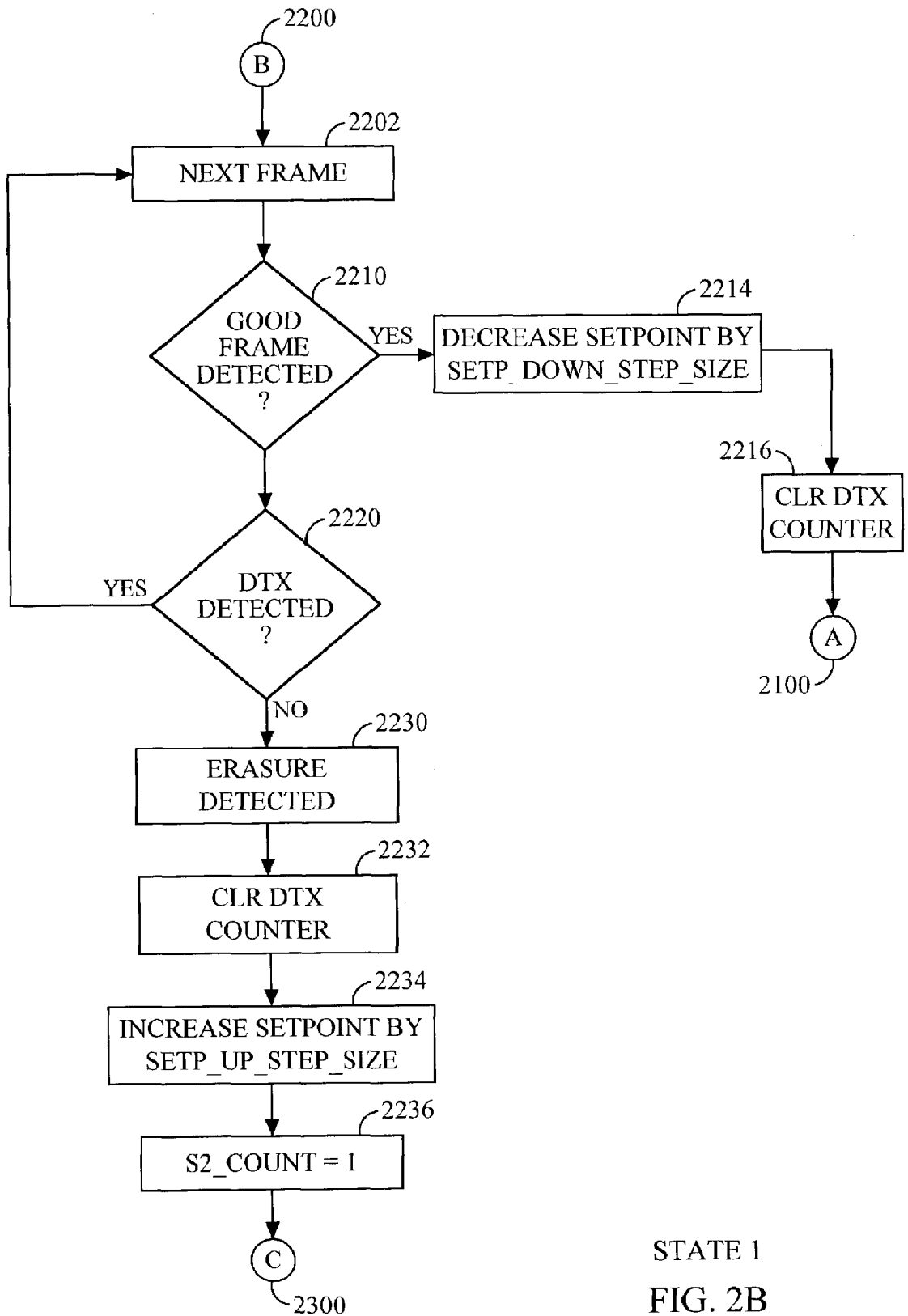

Continuing to FIG. 2B at point B 2200, the routine proceeds to block 2202 where it awaits the next frame. Following receipt an characterization of the next frame, the routine proceeds to block 2210 to check if a GOOD FRAME was received. If a GOOD FRAME is received after a number of consecutive DTX indications, the current setpoint is greater than or equal to the minimum setpoint required to achieve the desired QoS. The routine decreases the setpoint by the predetermined downward step size 2214, clears the DTX counter 2216, and returns to State 0 via point A 2100.

If a GOOD FRAME was not detected in block 2210, the routine next proceeds to block 2220 and checks to see if DTX was detected. If so, the routine remains in State 1 and returns to block 2202 to await the next frame. If DTX is not detected, only one frame type remains and thus the routine proceeds to block 2230 where it determines that it was an ERASURE that was detected. The routine proceeds by clearing the DTX counter in block 2232, increasing the setpoint by the predetermined upward step size in block 2234 2234, initializing S2_COUNT to one in block 2236, and proceeding to State 2 via point C 2300.

Figure 2C:
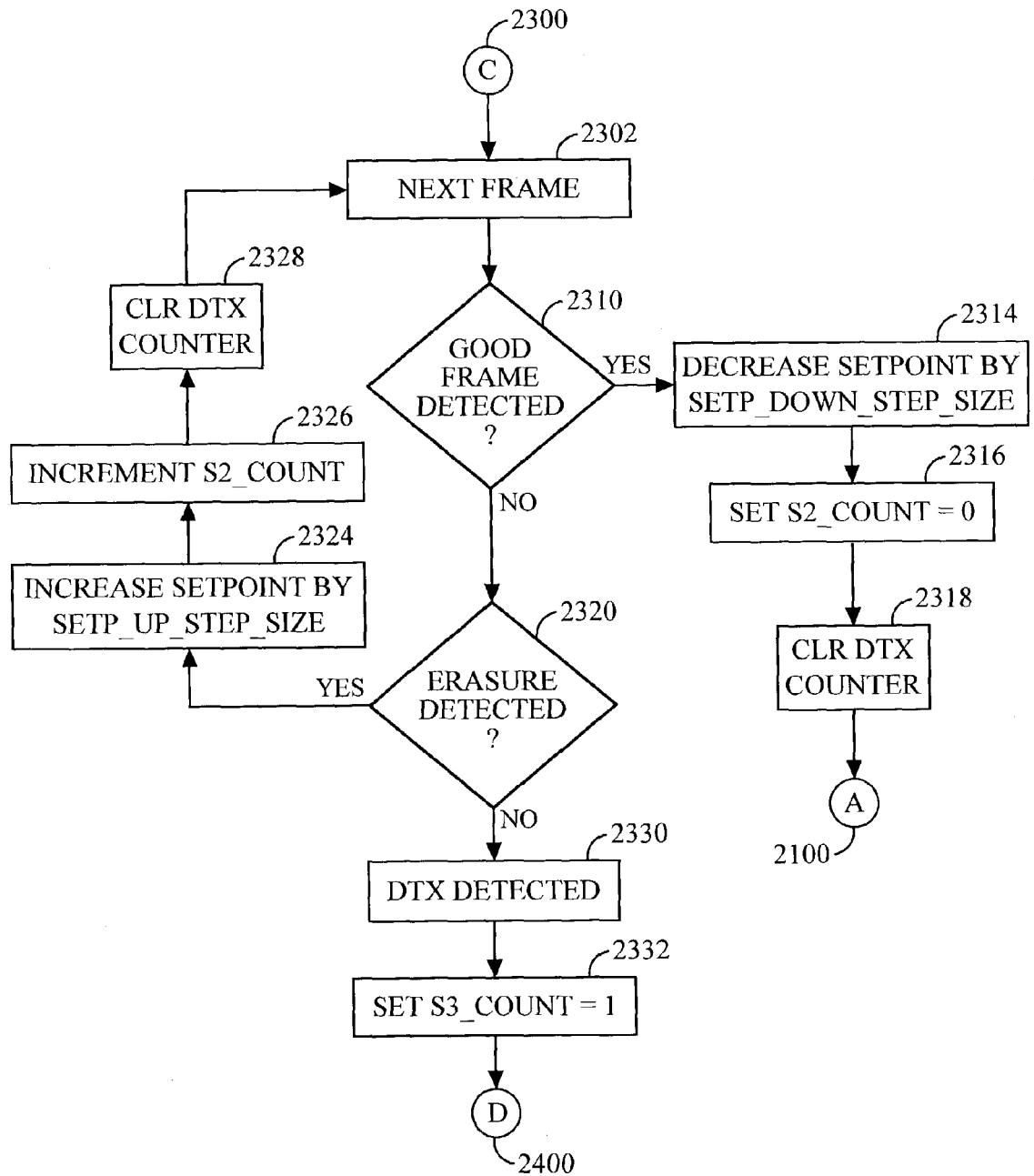

Referring now to FIG. 2C, point C 2300 provides the entry into State 2. At State 2, the routine awaits the receipt and characterization of the next frame in block 2302. The routine then proceeds to block 2310 and checks to see if the received frame was a GOOD FRAME. As always, a GOOD FRAME detection indicates the setpoint is likely at or above the minimum required to maintain the desired Quality of Service. Thus, the routine decreases the setpoint by the predetermined downward step size in block 2314, resets S2_COUNT to zero in block 2316, clears the DTX counter in block 2318, and returns to State 0 FIG. 2A) via point A 2100.

If a GOOD FRAME was not detected in block 2310, the routine in block 2320 checks to see if an ERASURE was detected. If so, it is possible that the setpoint is too low following the number of consecutive DTX detections indicated in State 0, but it is also possible that a false ERASURE was indicated. Thus, in block 2324, the routine increases the setpoint by the predetermined upward step size and then increments S2_COUNT in block 2326 to track the number of frames the algorithm stays in State 2 before going back to State 0 (FIG. 2A). The routine next proceeds to block 2328 and clears the DTX counter since a frame other than DTX was detected, and remains in State 2, returning to block 2302 to await the next frame.

If an ERASURE was not detected in block 2320, the routine moves to block 2330 and indicates that it was a DTX that was detected. The DTX detection algorithm or the Rate Determination Algorithm has detected a number of DTX and ERASURE frames without having detected a GOOD FRAME if this point in the algorithm is reached. The routine then proceeds to block 2332 and initializes the S3_COUNT to one and then proceeds to State 3 via point D 2400.

Figure 2D:
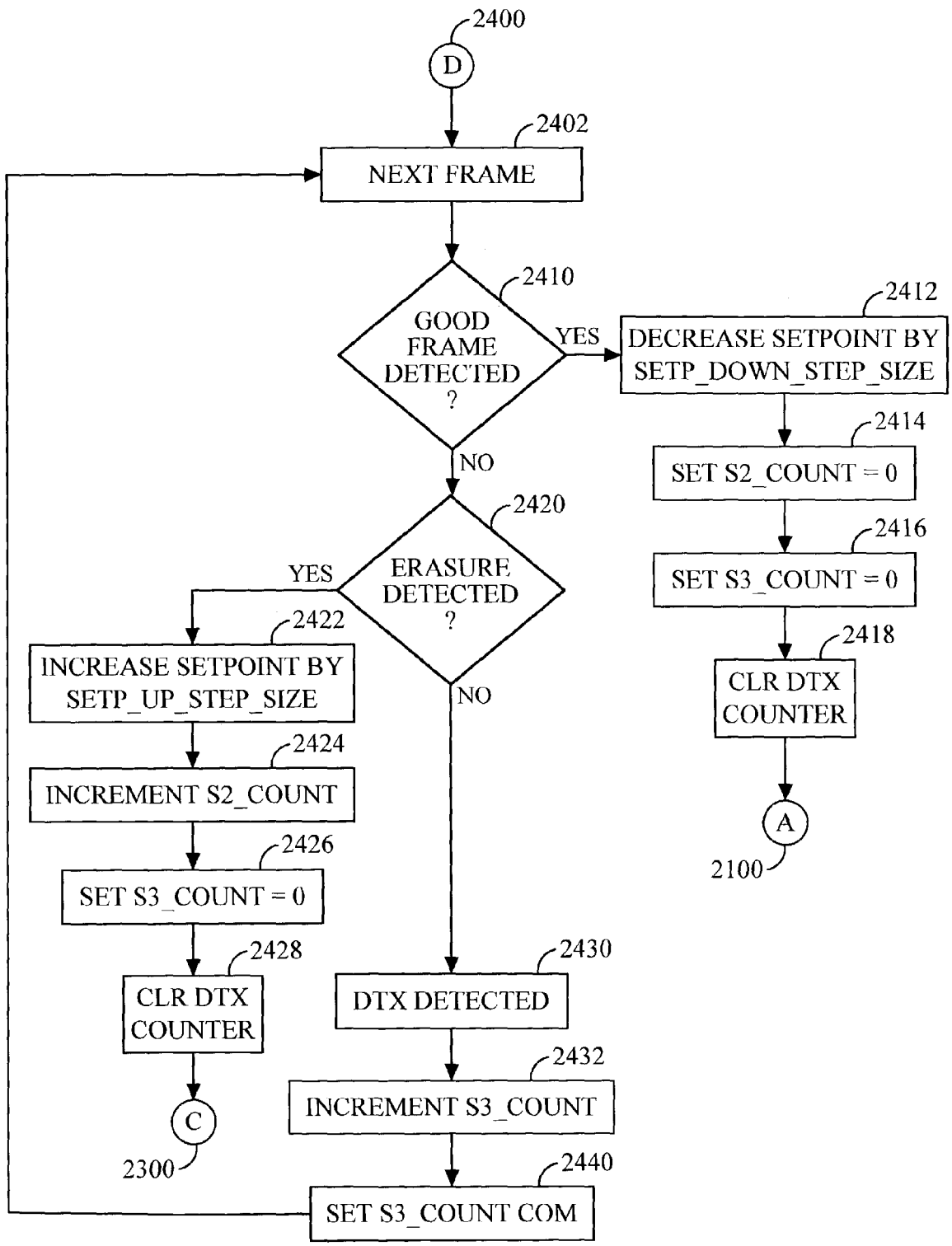

Referring to FIG. 2D, State 3 is entered via point D 2400. As in all previous states, State 3 begins in block 2402 by awaiting receipt and detection of the next frame. Following detection of the frame, the routine moves to block 2410 and checks to see if a GOOD FRAME was detected.

If a GOOD FRAME was detected, the routine decreases the setpoint by the predetermined downward step size in block 2412, resets S2_COUNT to zero in block 2414, resets S3_COUNT to zero in block 2416, clears the DTX counter in block 2418, and returns to State 0 (FIG. 2A) via point A 2100.

If a GOOD FRAME was not detected in block 2410, the routine moves to block 2420 and checks to see if ERASURE was detected. If so, the routine increases the setpoint by the predetermined upward step size in block 2422, increments S2_COUNT in block 2424, resets S3_COUNT in block 2426, clears the DTX counter in block 2428, and returns to State 2 (FIG. 2C) via point C 2300.

If ERASURE was not detected in block 2420, the routine moves to block 2430 and indicates that DTX was detected. The routine next moves to block 2432 and increments the S3_COUNT to track the number of frames the algorithm stays in State 3 before going to any other state. The routine next performs an S3_COUNT compensation in block 2440 and returns to block 2402 in State 3 to await the next frame.

Figure 3:
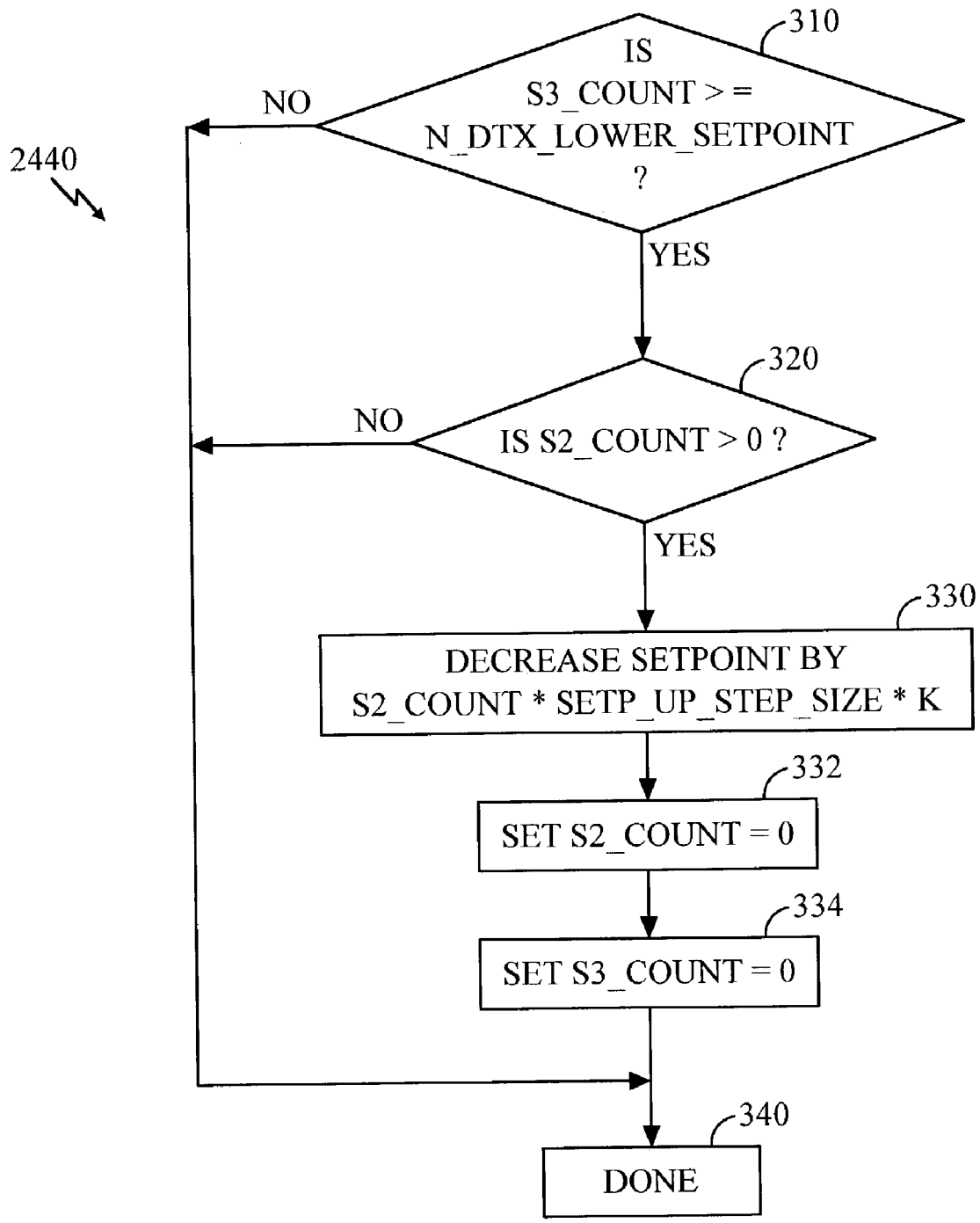
FIG. 3 is a flow chart of the subroutine to compensate the setpoint for a predetermined number of consecutive DTX detection.

The S3_COUNT compensation routine of block 2440 is detailed in FIG. 3. In block 310, the routine initially checks to see if the S3_COUNT value is greater than or equal to a predetermined value represented by the constant N_DTX_LOWER_SETPOINT. S3_COUNT in effect tracks the number of consecutive DTX detections indicated after reaching State 3. The number of consecutive DTX indications is tracked to allow the ROLPC routine to compensate for perceived erroneous ERASURE detection indicated during an extended period of DTX. If it is determined in block 310 that the S3_COUNT value is less than the predetermined threshold the routine moves to block 340 and indicates the compensation routine is done. If it is determined in block 310 that the S3_COUNT value equals or exceeds the predetermined threshold, the S3_COUNT compensation routine 2440 checks in block 320 to see if the S2_COUNT value is greater than zero. If S2_COUNT is zero the compensation routine moves to block 340 where it is done. If the S2_COUNT is non-zero, the compensation routine decreases the setpoint by an amount equal to S2_COUNT*SETP_UP_STEP_SIZE*K in block 330. K is a constant used to weight the amount of setpoint decrease the compensation routine allows. If K is set to one, the S3_COUNT compensation routine negates any increases in the setpoint believed to be false ERASURE detections. After decreasing the setpoint the compensation routine moves to block 332 and resets S2_COUNT to zero and then resets S3_COUNT to zero in block 334. The S3_COUNT compensation routine then moves to block 340 where it is done.

Figure 4:
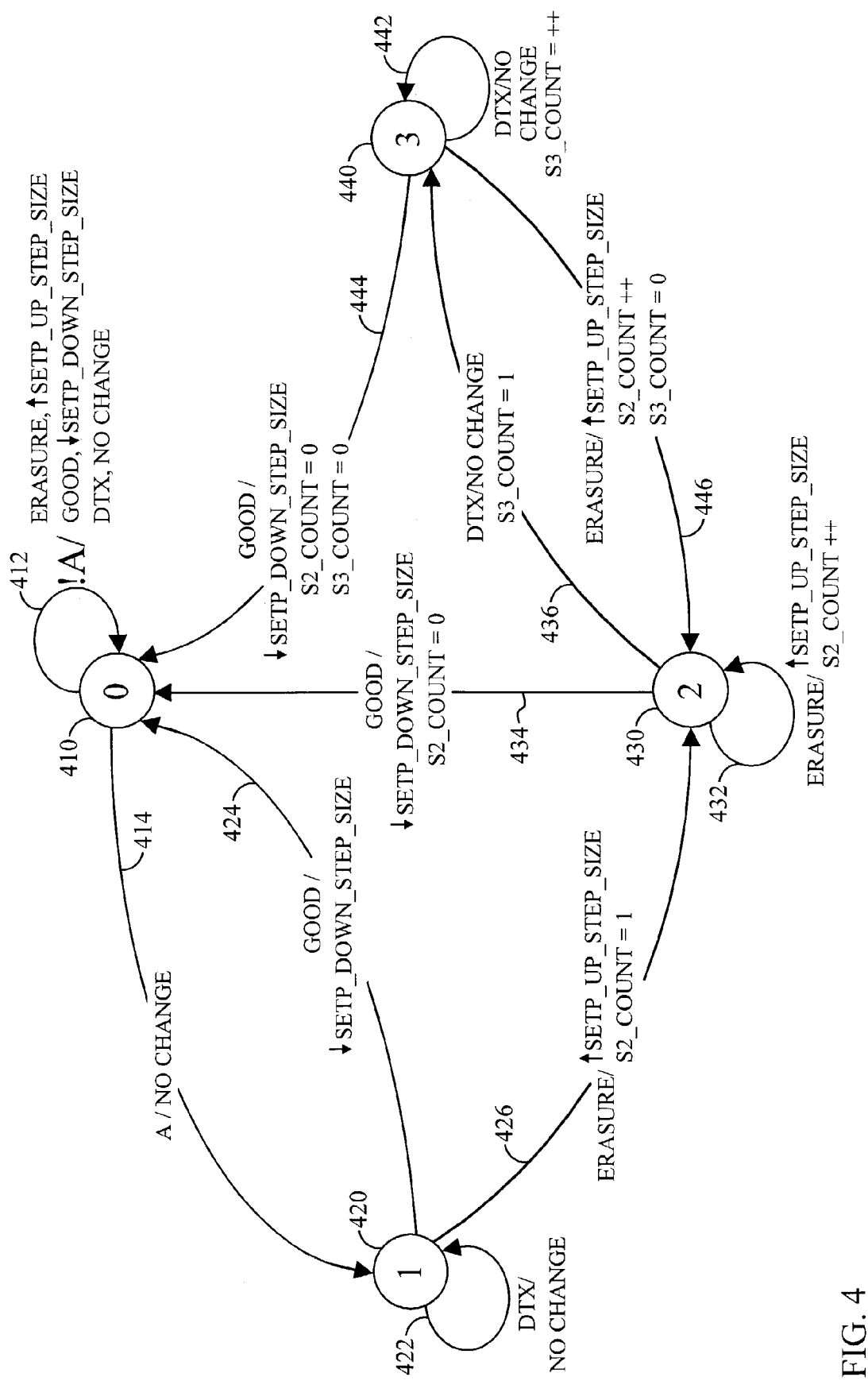
FIG. 4 is a state diagram of power control setpoint optimization for imperfect DTX detection.

The ROLPC setpoint algorithm is succinctly shown in the state diagram of FIG. 4. The algorithm begins in State 0, 410. The state machine advances to State 1, 414, upon an 'A' event, where 'A' is defined to be a number of consecutive DTX frames equal to N_DTX_S0_TO_S1. There is no change to the setpoint or state counters upon the 'A' event. The state machine remains in State 0, 410, for any !A event 412. If the !A event 412 is instead ERASURE, the setpoint is increased by SETP_UP_STEP_SIZE. If the !A event 412 is GOOD FRAME the setpoint is decreased by SETP_DOWN_STEP_SIZE. If the !A event 412 is a DTX, there is no change to the setpoint.

The state machine remains in State 1, 420, for any DTX detection 422 and for this event there is no change to the setpoint or any state counters. If there is a GOOD FRAME event 424 while in State 2, 420, the state machine returns to State 0, 410. The GOOD FRAME event 424 also causes the setpoint to be decreased by SETP_DOWN_STEP_SIZE. If the State 2, 420, event is ERASURE 426 the setpoint is increased by SETP_UP_STEP_SIZE and S2_COUNT is set to one. The state machine also advances to State 2, 430.

In State 2, 430, an ERASURE event 432 results in an increase in the setpoint by SETP_UP_STEP_SIZE and increment of S2_COUNT. The state machine remains in State 2, 430, following this event. If a GOOD FRAME event occurs 434 the state machine returns to State 0, 410, decreases the setpoint by SETP_DOWN_STEP_SIZE, and resets S2_COUNT to zero. A DTX event 436 occurring while in State 2, 430, results in the state machine advancing to State 3, 440. The setpoint does not change as a result of this event but the S3_COUNT is initialized to one.

In State 3, 440, a DTX event 442 results in no change to the setpoint but an increment of the S3_COUNT. The state machine remains in State 3, 440, following the DTX event 442. If the event is a GOOD FRAME 444, the state machine returns to State 0, 410, decreases the setpoint by SETP_DOWN_STEP_SIZE, resets S2_COUNT to zero, and resets S3_COUNT to zero. An ERSURE event 446 while in State 3, 440, results in an increase in the setpoint by SETP_UP_STEP_SIZE, increment of S2_COUNT, and reset S3_COUNT to zero.

Figure 5:
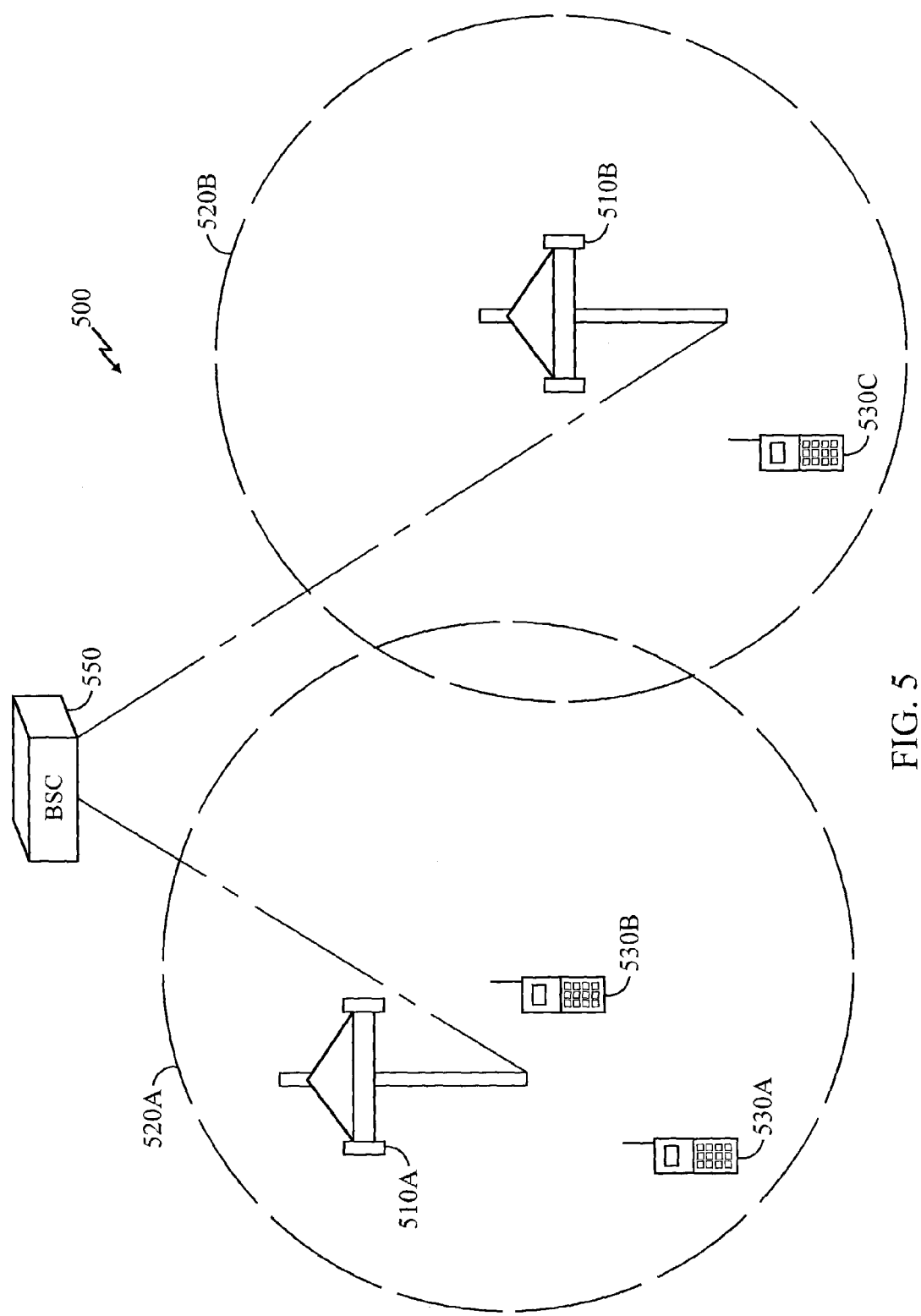
FIG. 5 is a diagram illustrating a wireless communication system implementing power control setpoint optimization.

One embodiment of an implementation of power control setpoint optimization within a wireless communication system is shown in FIG. 5. A communication system 500 is shown as a wireless communication system, such as a CDMA wireless phone system. The communication system 500 has one or more base stations, 510a and 510b, here shown as antenna systems typical of a wireless phone system. Although only two base stations 510a, 510b are shown, it is understood that the communication system 500 may support any number of base stations. Each base station 510a, 510b provides coverage for a corresponding cell 520a, 520b. The coverage areas or cells 520a, 520b supported by the two base stations 510a, 510b are shown to be overlapping. However, it is understood that where more than one base station is supported in the communication system 500, the cells supported by each base station may or may not overlap. Additionally, the cells of any three or more base stations may have some common coverage areas or may be mutually exclusive.

Since the operation of the communication system 500 within each cell is substantially identical, the discussion will focus on the operation within a single cell. A base station 510a supports coverage over a corresponding cell 520a.

There may be one or more Mobile Stations (MS) 530a, 530b, within the cell 520a simultaneously communicating with the base station 510a. The MS 530a, 530b are shown as portable phones but it is understood that the MS may be portable phones, mobile phones operating within vehicles, fixed position phones, or wireless local loop phones. The base station 510a communicates to each MS 530a, 530b, over a forward link channel and each MS 530a, 530b communicates to the base station 510a over a reverse link channel. The communication links may be over a continuously active channel or may allow for DTX. The base station 510a also communicates with a Base Station Controller (BSC) 550 that provides the communication link to a Public Switched Telephone Network (PSTN) not shown. Power control is used at a minimum on the reverse link but may also be implemented on the forward link. Closed loop power control converges the communication link to the minimum transmitted power required to achieve a desired Quality of Service (QoS).

In the reverse link, the signal received at the base station 510a is measured against a power control setpoint as part of the power control loop. The setpoint corresponds to a level of QoS measured as FER. The setpoint comparison and FER measurement may be implemented in the BS 510a or may be implemented in the BSC 550. When the forward link utilizes power control techniques, the setpoint comparison and FER measurement is performed in the MS 530a.

In a DTX enabled channel, the power control optimization routine discussed above is implemented to optimize the channel capacity. The power control optimization routine may be implemented in hardware, in a digital signal processor, in an integrated circuit or portion of an integrated circuit, in a software routine, or in a combination of a software routine running on hardware. It is understood that the power control optimization technique is not limited to a particular implementation nor is it limited to a wireless telephone application. The optimization technique may be used in any DTX enabled communication link having power control and a power control setpoint related to a quality of service metric, such as FER.

Note also that the foregoing discussion has used the signals, codes and parameters defined in the CDMA 2000 standard as the exemplary signals, codes and parameters. This is for clarity of discussion only, and does not limit the scope of the present invention to CDMA 2000 systems. The principles of the present invention pertaining to step one search apply equally to any conceivable system which employs discontinuous transmission. The principles described herein in connection with outer loop power control apply to any conceivable system including examples such as W-CDMA, IS-95, and TD-SCDMA, and is equally applicable to "Forward" Outer Loop Power Control (FOLPC) in such systems.

Those skilled in the art will recognize how to adapt the various embodiments described herein for use with such alternate systems.

It should be noted that in all the embodiments described above, method steps can be interchanged without departing from the scope of the invention.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The previous description of embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the invention is not intended to be limited to the embodiments shown herein but is to be accorded the widest scope consistent with the principles and novel features disclosed herein.

What is claimed is:

1. In a communication device having discontinuous transmission (DTX) detection, a method of providing outer loop power control comprising:
   determining a compensation factor on the basis of a known non-zero probability of DTX detection given an erasure frame P(D/E) value;
   determining an expected target frame error rate (FER); and
   adjusting the expected target FER on the basis of the determined expected target FER and the compensation factor performing outer loop power control based on the expected target FER.

2. The method of claim 1, wherein the outer loop power control is reverse outer loop power control.

3. The method of claim 1, wherein the known non-zero P(D/E) is a constant value.

4. The method of claim 1, wherein the known non-zero P(D/E) is dynamically determined.

5. The method of claim 1, wherein the communication device is a CDMA base station, base station controller, or mobile station.

6. The method of claim 1, wherein the adjusting occurs during non-DTX occurrences.

7. The method of claim 1, further comprising:
   detecting consecutive DTX occurrences; and
   in response to the detection of consecutive DTX occurrences, lowering a power control setpoint associated with the outer loop power control.

8. In a wireless communication device having discontinuous transmission (DTX) detection, a method of providing outer loop power control comprising:
   detecting consecutive DTX occurrences; and
   in response to the detection of consecutive DTX occurrences, lowering a power control setpoint associated wit the outer loop power control.

9. The method of claim 8, wherein the outer loop power control is reverse outer loop power control.

10. The method of claim 8, wherein the wireless communication device is one of a CDMA base station, base station controller, or mobile station.

11. A wireless communication device having discontinuous transmission (DTX) detection and outer loop power control comprising:
    means for determining a compensation factor on the basis of a known non-zero probability of a DTX detection given an erasure frame P(D/E) value;
    means for determining an expected target frame error rate (FER); and
    means for adjusting the expected target FER on the basis of the determined expected target FER and the compensation factor.

12. The device of claim 11, wherein the outer loop power control is reverse outer loop power control.

13. The device of claim 11, wherein the known non-zero P(D/E) is a constant value.

14. The device of claim 11, wherein the known non-zero P(D/E) is dynamically determined.

15. The device of claim 11, wherein the wireless communication device is one of a CDMA base station, base station controller, or mobile station.

16. The device of claim 11, wherein the adjusting occurs during non-DTX occurrences.

17. The device of claim 11, further comprising:
    means for detecting consecutive DTX occurrences; and
    means for lowering a power control setpoint associated with the outer loop power in response to the detection of consecutive DTX occurrences.

18. In a wireless communication device having discontinuous transmission (DTX) detection and outer loop power control comprising:
    means for detecting consecutive DTX occurrences; and
    means for lowering a power control setpoint associated with the outer loop power control on the basis of at least the detecting.

19. The device of claim 18, wherein the outer loop power control is reverse outer loop power control.

20. The device of claim 18, wherein the wireless communication device is one of a CDMA base station, base station controller, or mobile station.

21. In a communication device having discontinuous transmission (DTX) detection, a method of providing outer loop power control comprising:
    estimating a number of false erasure detections; and
    reducing the power control setpoint in proportion to the estimated number of false erasure detections.

22. The method of claim 21, wherein the power control setpoint is reduced by a value equal to the estimated number of false erasure detections multiplied by a predetermined downward step size.

23. The method of claim 21, wherein the estimating comprises determining the number of false erasure detections in a state machine comprising:
    in an initial state:
        adjusting the power control setpoint up by a predetermined upward step size following an erasure frame detection, and
        adjusting the power control setpoint down by a predetermined downward step size following a good frame detection;
    in a first state reached from the initial state following a predetermined number of consecutive DTX detections in the initial state:
        adjusting the power control setpoint as in the initial state,
        returning to the initial state following the good frame detection, and
        initializing an S2 counter following the erasure frame detection;
    in a second state reached from the first state following the erasure frame detection in the first state:
        adjusting the power control setpoint as in the initial state,
        returning to the initial state and clears the S2 counter following the good frame detection,
        initializing an S3 counter upon a DTX detection, and
        incrementing the S2 counter following the erasure frame detection; and
    in a third state reached from the second state following the DTX detection in the second state:
        adjusting the power control setpoint as in the initial state,
        incrementing the S3 count for each DTX detection while in the third state,
        returning to the second state, incrementing the S2 counter, and
        clearing the S3 counter following the erasure frame detection, and returning to the initial state, resetting the S2 counter, and resetting the S3 counter following the good frame detection.

24. The method of claim 23, wherein the estimate of the number of false erasures is equal to the value of the S2 counter.

25. The method of claim 23, wherein the estimate of the number of false erasures is equal to the value of the S2 counter when the S3 counter equals or exceeds a predetermined value.

26. The method of claim 23, wherein the reducing the power control setpoint involves reducing the power control setpoint by a value equal to the value of the S2 counter multiplied by the predetermined downward step size multiplied by a constant K.

27. The method of claim 26, wherein K equals 1.

28. The method of claim 21, the method further comprising: determining a compensation factor on the basis of a known non-zero P(D/E) value; determining an expected target frame error rate (FER); and adjusting the expected target FER in response to the determined expected target FER and the compensation factor.

29. The method of claim 28, wherein the compensation factor is equal to (1−P(D/E)).

* * * * *